April 1, 1947. W. F. BENNING 2,418,288
NON-LOCKING BRAKE VALVE
Filed March 30, 1945

INVENTOR.
WALTER F. BENNING
BY
his ATTORNEYS

Patented Apr. 1, 1947

2,418,288

UNITED STATES PATENT OFFICE 2,418,288

NONLOCKING BRAKE VALVE

Walter F. Benning, Toledo, Ohio, assignor to Mack Manufacturing Corporation, New York, N. Y., a corporation of Delaware Application March 30, 1945, Serial No. 585,639

12 Claims. (Cl. 188—181)

This invention relates to vehicle brakes and more particularly to means for preventing locking of the brakes when the brakes are applied to slow down or stop the vehicle.

It is well known that the greatest braking effect is secured when the wheels of the vehicle are turning rather than when they are locked and slide upon the surface of the road. It is, of course, desirable to prevent the tires from sliding as there is danger of skidding, with consequent loss of control, and sliding causes excessive wear of the tire by the road surface. During deceleration of the vehicle caused by the application of the brakes, any one of the brakes may lock first due to any one of various conditions, such as road surface under the wheel, the condition of the shoes and brake drum, or unequalized braking effects produced by the brake applying means, producing an unbalanced retarding action on the vehicle tending to change the direction of movement of the vehicle. This is especially serious when one of the front or steering wheels locks.

I am aware of attempts of others to prevent locking of the wheels to overcome the objections referred to by mechanisms and devices which have been satisfactory to a degree. Many of those devices involve complicated mechanisms and some of them are dependent on the use of governors.

It is therefore an object of this invention to provide improved means more particularly applicable to fluid operated brakes for use on automobile wheels, for automatically partially releasing the brakes of a wheel just before the wheel would cease to rotate as it is decelerated by the application of the brakes, thereby preventing locking of the wheel and producing maximum braking effects to bring the vehicle to a stop.

It is a further object of this invention to provide means to release the pressure in a brake operating pressure cylinder as the decelerated speed of the wheel approaches zero, by a simple bleeding valve controlled by a pilot frictionally engaging the brake drum and so supported and controlled as to move with the brake drum when the brakes are applied, and to move counter to the movement of the brake drum just before the brake drum would stop under locking braking action in service.

Figure 1:
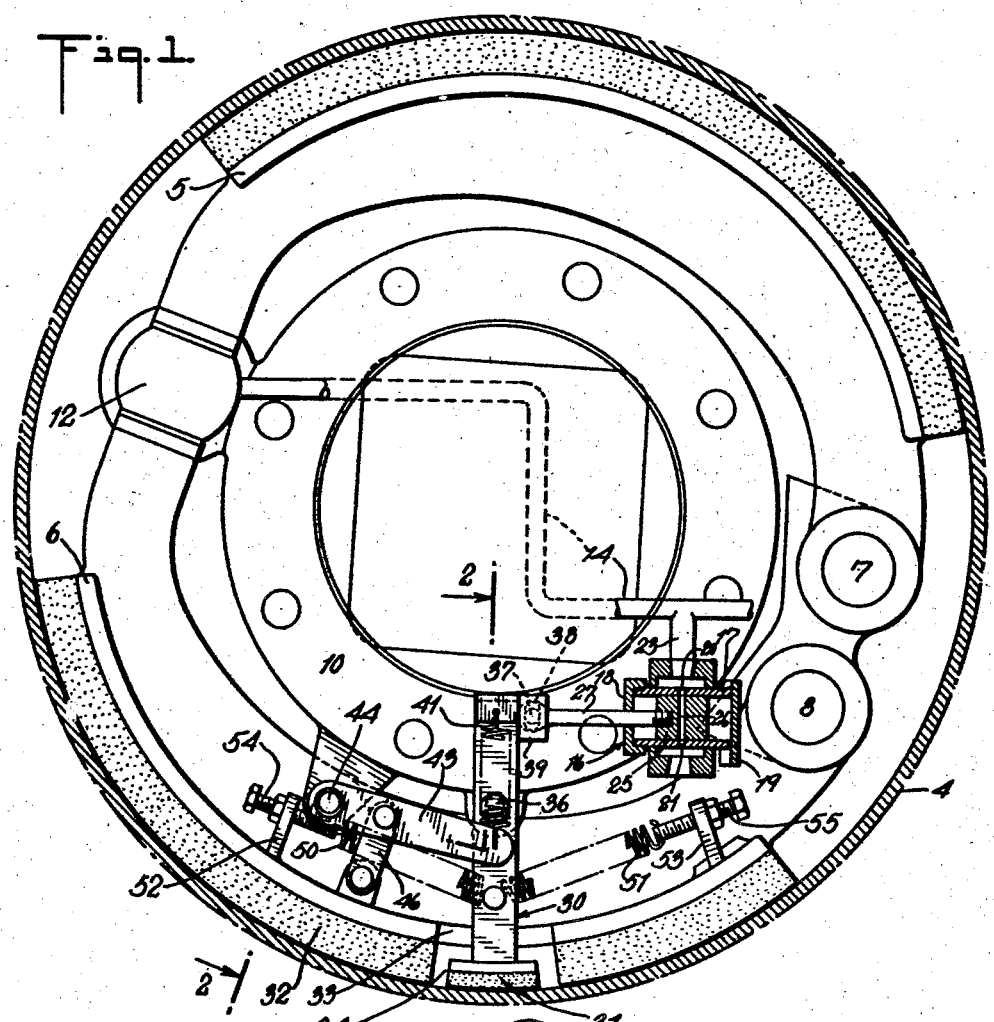
Figure 2:
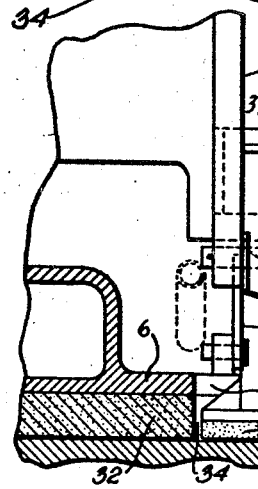

Other objects of this invention will appear from the following description taken in connection with the drawings in which:

Figure 1 is a side view of a braking mechanism in which my invention has been incorporated, and Figure 2 is a view in vertical section on the line 2—2 of Figure 1.

In the drawings, the brake drum indicated at 4 may be of any standard construction and may be supported on the vehicle wheel in any suitable manner.

Cooperating with the interior surface of the flange of the brake drum is a pair of brake shoes 5 and 6, also of any suitable and preferred construction, shown as pivoted at 7 and 8 on lugs carried by a brake shoe supporting member 10, supported in any well-known manner on the wheel axle housing. Also supported on a lug on the member 10 is a fluid actuated brake shoe operating means 12 which is shown diagrammatically as it may be of any suitable well-known construction, for applying expanding and separating pressure against the free ends of the brake shoes. Fluid under pressure is supplied to the means 12 through a pipe 14. Preferably there is a pipe 14 for each brake to which fluid under pressure is supplied through a plural ported valve from a main supply pipe not shown.

In order not to interfere with the customary operation and control of the brake, except to prevent locking of the wheels, I have provided a bleed valve to exhaust fluid from the pipe 14 and fluid brake operating means just before the wheel would ordinarily be stopped by the braking action produced under the control of the drive if such valve were not provided.

The valve comprises a casing 16 which is supported on the member 10 by any suitable means. The body of the casing may be a cylinder 17 and one of its ends 18 may be removable to provide access to the valve chamber, and its other end 19 may be welded or otherwise secured thereto and may be secured by any suitable means to the member 10.

The cylinder 17 is provided with oppositely located radial ports 20 and 21, the port 20 communicating with a pipe 23 connected to the fluid pressure pipe 14 and the port 21 communicating with the atmosphere.

Cooperating with the ports 20 and 21 is a sliding valve block 25 which is provided with a through-port 26 that may be brought into registration with the ports 20 and 21 to connect the pipe 14 to the atmosphere to bleed the fluid brake operating means to release the brake shoes. When the valve is in the position shown, it connects the fluid carrying pipe 14 to the atmosphere. The ports are of such small diameters that the brake may be applied when the valve block is in its intermediate position.

When the valve block 25 is moved to the right or left, it seals the end of the pipe 23 permitting control of the brake in the usual manner. The rate of bleeding may be controlled by the size of the ports and, if desired, one of the ports may be made adjustable to increase or decrease the rate of bleeding effected by the valve. The valve block 25 is provided with a stem 27 extending to the exterior of the casing by means of which it may be operated.

For the purpose of controlling and operating the valve, I employ a pilot 30 provided with an outer end or head 31 of any suitable shape for frictional engagement with the inner face of the flange of the brake drum 4, and I prefer to have it engage the flange of the drum within the area engaged by one of the brake shoes shown here as the brake shoe 6. For this purpose, the brake shoe 6 and its friction facing 32 are provided with openings or notches 33 and 34 in their edges of slightly longer dimensions in the direction of the length of the brake shoe than that of the outer end or head 31 of the pilot 30 so that the head 31 of the pilot may travel short distances to the right or left with respect to the brake shoe depending upon the direction of movement of the wheel and brake drum.

The pilot 30 is slotted and pivoted intermediate of its ends on a pivot pin 36 supported on the member 10 and at its inner end it is provided with a pin 37 extending into a vertically elongated slot 38 in the head 39 of the valve stem 27 so that the pilot may move radially and may pivot without applying a force laterally of the valve stem.

A spring 41 connects the inner end of the pilot to the free end of an arm 43 supported on a pivot pin 44 mounted in a lug on the member 10 and connected intermediate of its ends by a link 46 to a lug on the brake shoe 6. As the brake shoe is moved outwardly into braking engagement with the flange of the drum, the head 31 of the pilot is resiliently pressed into working frictional contact with the inner face of the flange on the drum.

For the purpose of supporting the pilot normally out of contact with the flange of the brake drum and for centering the pilot and for returning it into its normal or home position shown, I provide springs 50 and 51 located on opposite sides of the pilot and connected thereto and to lugs 52 and 53 on the brake shoe 6 through the intermediary of tensioning and adjusting screws 54 and 55. By this means the springs 50 and 51 may be tensioned to support the head of the pilot at the proper distance from the flange of the brake drum and to center the pilot and valve block 25 and to overcome the drag of friction on the head of the pilot by the flange of the drum at a decelerated speed just short of zero speed. These springs return the pilot from either of its moved positions in engagement with an end wall of the slots 33 and 34 into the position shown in Figure 1 in which the bleeding valve relieves the pressure on the brake shoes. Upon a slight increment in the speed of rotation of the drum, the friction of the drum on the head of the pilot rocks the pilot to close the bleeding valve placing the operation of the brakes again under the sole control of the operator. The lateral movement of the head of the pilot may be so short and the parts may be so proportioned and adjusted that the pressure on the brake shoes will be alternately decreased and increased in rapid succession which is known to be desirable when running on slippery roads.

While I have described my invention in detail with reference to a preferred emodiment thereof, it is to be understood that this is not to be considered limiting, and that I reserve the right to all such modifications and changes as fall within the principles of this invention, and the scope of the appended claims.

I claim:

1. The combination with a rotatable member, a brake, and means for applying said brake with pressure tending to lock said member against rotation, of a brake controlling element mounted for movement into engagement with said member and also for movement by and with said member, means for moving said element into engagement with said member as an incident to applying the brake, means for restoring said element against the action of said member as the speed of said member is reduced by said brake to a point just short of zero speed and means controlled by said element in its restored position to reduce the braking effect produced by said brake so as to prevent said brake from locking said member against rotation.

2. The combination with a rotatable member rotatable in either direction, a brake, and means for moving said brake against said member with pressure tending to lock said member against rotation, of a brake controlling element, means for movably supporting said element for movement against said member and for movement thereby in either direction upon the rotation of said member, means for moving said element against said member as an incident to the movement of said brake against said member, means for restoring said element against the action of said member to a central position as the speed of rotation of said member is reduced by said brake to a point just short of zero speed, and means controlled by said element in its restored central position to reduce the braking effect product by said brake so as to prevent said brake from locking said member against rotation.

3. The combination with a rotatable member, a brake, and means for pressing said brake against said member with pressure tending to lock said member against rotation, of a brake controlling element normally spaced from said member and movably mounted for movement into the engagement with said member and for movement with said member; means for moving said element into engagement with said member as an incident to pressing said brake into engagement with said member so as to be moved by said member upon rotation thereof; means for restoring said element from the position into which it is moved by said member against the action of said member as the speed of said member is reduced by said brake to a point just short of zero speed and means controlled by said element in said restored position for reducing the braking effect produced by said brake so as to prevent said brake from locking said member against rotation.

4. The combination with a rotatable member, a brake and fluid pressure actuated means for operating said brake, of a brake controlling element, means for movably supporting said element for movement into engagement with said member and for movement by and with said member, means for restoring said element from a position into which it has been moved by said member against the action of said member as the speed of said member is decelerated to a point just short of zero speed, and means controlled by said element in said restored position to reduce the pressure of the fluid acting on said brake.

5. The combination with a rotatable member, a brake and fluid pressure actuating means for operating said brake, of a brake controlling element, means movably supporting said element for movement into the engagement with said member and for movement by said member, means for restoring said element from the position into which it is moved by said member against the action of said member as the speed of said member is decelerated to a point just short of zero speed, and a bleeding valve for bleeding fluid from said fluid pressure actuating means moved into open position by said element as it is moved into said restored position.

6. The combination with a rotatable member, a brake, and means for pressing said brake against said member, of a brake controlling element, means movably supporting said element for movement into engagement with said member and for movement by and with said member, means for moving said element against said member including spring means, spring means for restoring said element from the position into which it is moved by said member against the action of said member as the speed of rotation is reduced to a point just short of zero speed, and means controlled by said element in such restored position for reducing the braking effect of said brake.

7. The combination with a rotatable member, a brake, and means for moving said brake against said member, a brake controlling element for reducing the braking effect of said brake, means for supporting said element for movement into engagement with said member and for movement by and with said member, means for moving said element into engagement with said member as said brake is applied, comprising yielding means connecting said element and said brake member, whereby said element is moved by and with said member as it is rotated when the brake is applied, yielding means for restoring said element against the action of said member upon deceleration of the speed of said member to a speed just short of zero speed for reducing the braking effect of said brake and means controlled by said element in such restored position to reduce the braking effect of the brake.

8. The combination with a rotatable member, a brake, and means for pressing said brake against said member with pressure tending to lock said member against rotation of a brake controlling element, means for supporting said element for movement into contact with said member and for movement by and with said member, means on said brake limiting such latter movement of said element, means for restoring said element from the position into which it is moved by said member against the action of said member as the speed of said member is reduced by said brake to a point just short of zero speed, and means controlled by said element when so restored for reducing the pressure of said brake by such an amount as to prevent said brake from locking said member against rotation.

9. The combination with a rotatable member, a brake, and means for pressing said brake against said member with pressure tending to lock said member against rotation, said brake being provided with a radially extending slot, of a movably mounted brake controlling element projecting into said slot and adapted to engage said member to be moved thereby into engagement with an end wall of said slot, means for restoring said element against the action of said member as the speed of said member is reduced by said brake to a point just short of zero, and means controlled by said element when restored for reducing the pressure with which said brake engages said member to such an extent as to prevent said brake from locking said member against rotation.

10. The combination with a rotatable member rotatable in either direction, a brake, and means for pressing said brake against said member with pressure tending to lock said member against rotation, said brake being provided with a slot extending therethrough in a direction normal to the braking surface of said member, of a brake controlling element, means for supporting said element for movement into engagement with said member and for movement by said member in either direction upon rotation of said member into engagement with an end wall of said slot, means for restoring said element against the action of said member as the speed of rotation of said member decreases to a point just short of zero, and means controlled by said element when so restored for reducing said pressure so as to prevent said brake from locking said member against rotation.

11. The combination with a rotatable member, a brake and means for pressing said brake against said rotatable member with pressure tending to lock said member against rotation, of a brake controlling element, means supporting said element for movement into engagement with said member and for movement by said member upon rotation of said member, means for limiting the movement of said element by said member, means for restoring said element from the position to which it is moved by said member against the action of said member as the speed of said member is reduced by said brake to a point just short of zero speed, and means controlled by said element when so restored for reducing the braking effect of said brake to an extent to prevent said brake from locking said member against rotation.

12. The combination with a rotatable member, a brake, and pressure means for applying the brake, of a brake control element, means for moving the control element into engagement with the rotatable member as an incident of applying the brake, means for restoring the control element against the action of the rotatable member as the rotational speed thereof is braked down, and means controlled by the control element in its restored position to reduce the braking pressure of the brake.

WALTER F. BENNING.

REFERENCES CITED

The following references are of record in the file of this patent:

UNITED STATES PATENTS

| Number | Name | Date |
|---|---|---|
| 2,185,003 | Stoddard | Dec. 26, 1939 |

Certificate of Correction

Patent No. 2,418,288. April 1, 1947.

WALTER F. BENNING

It is hereby certified that error appears in the printed specification of the above numbered patent requiring correction as follows: Column 4, line 43, claim 2, for "product" read *produced*; and that the said Letters Patent should be read with this correction therein that the same may conform to the record of the case in the Patent Office.

Signed and sealed this 20th day of May, A. D. 1947.

[SEAL]

LESLIE FRAZER,
*First Assistant Commissioner of Patents.*